(12) United States Patent
Hartley

(10) Patent No.: US 10,067,549 B1
(45) Date of Patent: Sep. 4, 2018

(54) COMPUTED DEVICES

(75) Inventor: Jay H. Hartley, San Ramon, CA (US)

(73) Assignee: Modius Inc, San Francisco, CA (US)

( * ) Notice: Subject to any disclaimer, the term of this patent is extended or adjusted under 35 U.S.C. 154(b) by 291 days.

(21) Appl. No.: 13/090,250

(22) Filed: Apr. 19, 2011

Related U.S. Application Data

(60) Provisional application No. 61/326,129, filed on Apr. 20, 2010.

(51) Int. Cl.
*G06F 1/00* (2006.01)
*G06F 1/32* (2006.01)

(52) U.S. Cl.
CPC ...................................... *G06F 1/32* (2013.01)

(58) Field of Classification Search
CPC .............................. G06F 1/206; G06F 1/3203
See application file for complete search history.

(56) References Cited

U.S. PATENT DOCUMENTS

| | | | |
|---|---|---|---|
| 6,389,464 B1 | 5/2002 | Krishnamurthy | |
| 6,963,925 B1 | 11/2005 | Ishikawa et al. | |
| 7,640,443 B2 * | 12/2009 | Fujimoto | 713/300 |
| 2001/0049721 A1 | 12/2001 | Blair et al. | |
| 2002/0087622 A1 | 7/2002 | Anderson | |
| 2002/0103898 A1 | 8/2002 | Moyer | |
| 2003/0065721 A1 | 4/2003 | Roskind | |
| 2003/0118353 A1 | 6/2003 | Baller | |
| 2003/0135566 A1 | 7/2003 | Nishiguchi | |
| 2004/0071148 A1 | 4/2004 | Ozaki | |
| 2004/0208188 A1 | 10/2004 | Kimura | |
| 2005/0102406 A1 | 5/2005 | Moon | |
| 2006/0136558 A1 * | 6/2006 | Sheehan et al. | 709/203 |
| 2006/0168275 A1 | 7/2006 | Lin | |
| 2009/0187782 A1 | 7/2009 | Greene | |
| 2009/0228726 A1 | 9/2009 | Malik | |
| 2009/0231152 A1 * | 9/2009 | Tung et al. | 340/660 |

FOREIGN PATENT DOCUMENTS

WO          2006015245          2/2006

* cited by examiner

*Primary Examiner* — Austin Hicks

(57) ABSTRACT

Methods and devices are disclosed herein for creating a computed device. The computed device can be based on a predetermined relationship between a plurality of computed points. The computed points can be based on values of power attributes received from networked power consuming devices. An alarm can be associated with the computed device.

15 Claims, 3 Drawing Sheets

COMPUTED DEVICES

CROSS REFERENCE TO RELATED APPLICATION

This application claims priority of U.S. Provisional Patent Application No. 61/326,129, filed Apr. 20, 2010, in the name of the same inventor, titled "Computed Devices," and is hereby incorporated by reference as if fully set forth herein.

BACKGROUND OF THE INVENTION

Embodiments of the invention relate in general to power management of devices and in particular to creating and managing virtual computed devices for remote power management of power consuming devices.

Power management of power consuming devices is often a critical aspect of managing a complex system, such as a building facilities system. Previous challenges consisted of providing easily configurable software-based monitoring client and a device that does not suffer from the shortcoming of then existing facilities control and management systems. Some of these challenges have been addressed. However, there is still a need to provide software based controls which allow a user to determine and configure complex relationships between power consuming devices of a system in order to optimize power consuming attributes of a system.

BRIEF SUMMARY OF THE INVENTION

One embodiment of the invention provides a method for creating a computed device. Values for a plurality of input points can be received at a server computer. Each input point may represent a power attribute of a power consuming unit. Values for a plurality of computed points may be determined. The value of each computed point may be based on at least one of the values of the plurality of input points. A value of a computed device may be determined from a relationship between the plurality of computed points.

Another embodiment of the invention provides a system including a plurality of power consuming devices communicatively coupled to a server computer over a network. The server computer may be configured to perform the methods disclosed herein.

Yet, another embodiment of the invention provides a computer readable medium containing instructions, which when executed by a processor causes the processor to perform the methods disclosed herein.

These and other embodiments of the invention are described in further detail below with reference to the following figures.

DETAILED DESCRIPTION OF THE INVENTION

Embodiments of the invention provide systems and methods for creating virtual computed devices based on metrics for critical facilities based on actual data collected from power consuming devices and regardless of which power consuming device the data was collected from. The computed devices can be associated with alarms based on the collected data. The computed devices provide visibility to operations of critical facilities to help ensure power availability, plan capacity, and optimize performance and consumption.

Figure 1:
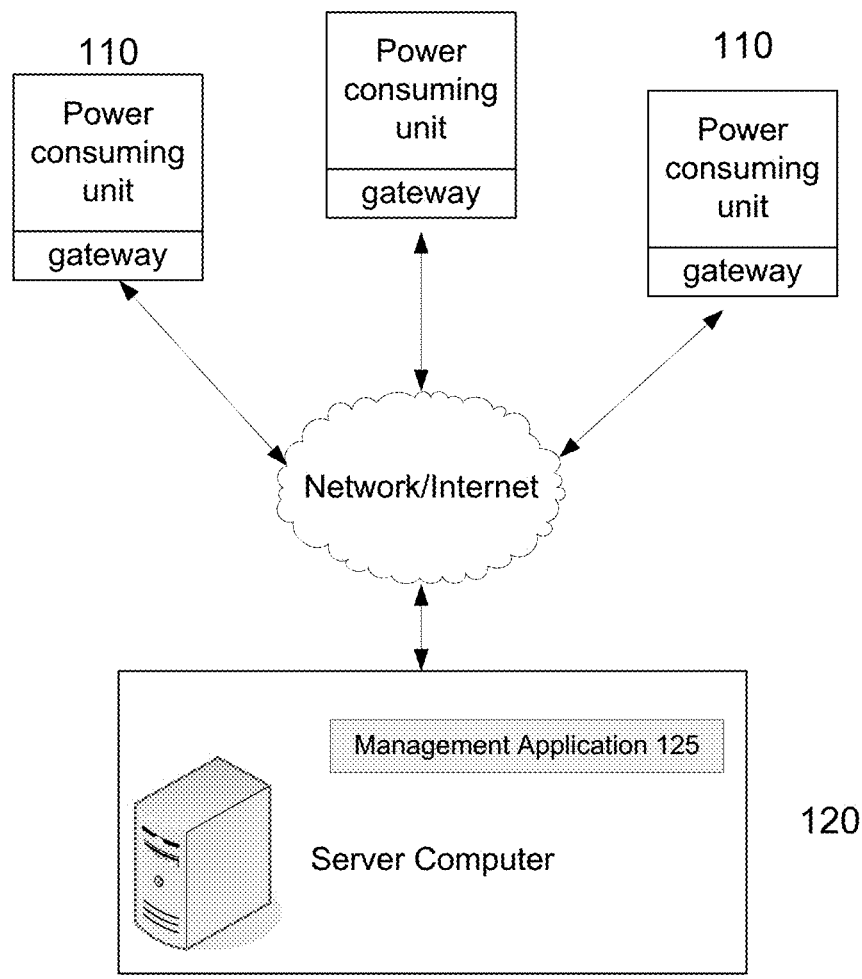
FIG. 1 is a schematic diagram of a system for creating and managing a computed device, according to an embodiment of the invention.

FIG. 1 shows a system 100 for creating and managing a computed device, according to an embodiment of the invention. The system 100 includes a plurality of power consuming devices 110. Each power consuming device 110 is communicatively coupled to a communications gateway, which in turn is communicatively coupled to a private or public network, such as the Internet. It should be understood that several power consuming devices 110 can communicate through a single gateway. It should also be understood that the power consuming devices 110 are not necessarily in the same physical location, for example, power consuming devices 110 can be separated by several yards or by thousands of miles. A user determines which power consuming devices 110 are part of the system 100 according to the needs of the user.

A power consuming device 110 may be any device which consumes electrical power and which a user wishes to remotely control, observe, and/or manage, typically located in a remote facility, such as a building or manufacturing plant. For example, the device can be a data center, power supply, an uninterrupted power supply (UPS), a compressor, a serial gateway, a head-end system, a programmable logic controller (PLC), an human machine interface (HMI) workstation, an IT server or a management system, or any device that supports industry-accepted protocols, including ModBus, Lon, DF1, N2, BACnet, CIP and SNMP, as well as other industry-accepted protocols.

Each gateway communicates with each respective power consuming device 110 using a specified native language protocol, and is capable of interrogating each device and receiving a set of monitoring variables in response. Such monitoring variables might be, for example, a measured temperature, a measured line voltage or current, a line pressure state for a leak detection system, etc.

The system 100 includes a server computer 120 communicatively coupled to power consuming devices 110 via the public or private network. The server computer 120 can be, for example, a server, cluster of networked servers/computers, general purpose computer, or a dedicated computer.

The server computer 120 includes a management application 125. The management application 125 is a software application which allows a user to remotely control, observe, and/or manage the power consuming devices 110 via their associated gateways. When prompted to do so by the server computer 120, the gateways are able to pass appropriate control variables to the power consuming devices 110, thereby commanding each device to perform a particular function, such as setting a thermostat to a particular temperature, turning on (or off) an HVAC apparatus, cascading through a set of security cameras, raising (or lowering) ambient light levels, and the like. An example of a suitable management application 125 which is applicable to embodiments of the invention is the OpenData™ Enterprise Edition Version 3.0 manufactured by Modius, Inc.

Specific details and examples of systems and methods for device control via gateways which can incorporated into the systems and methods disclosed herein are disclosed in commonly assigned U.S. patent application Ser. No. 11/194,114, entitled "UNIVERSAL CONFIGURABLE DEVICE GATEWAY" and U.S. patent application Ser. No. 11/313,260, entitled "EVENT MANAGER FOR USE IN A FACILITIES MONITORING SYSTEM HAVING NETWORK-LEVEL AND PROTOCOL-NEUTRAL COMMUNICATION WITH A PHYSICAL DEVICE", the entireties of both are incorporated by reference herein.

Figure 2:
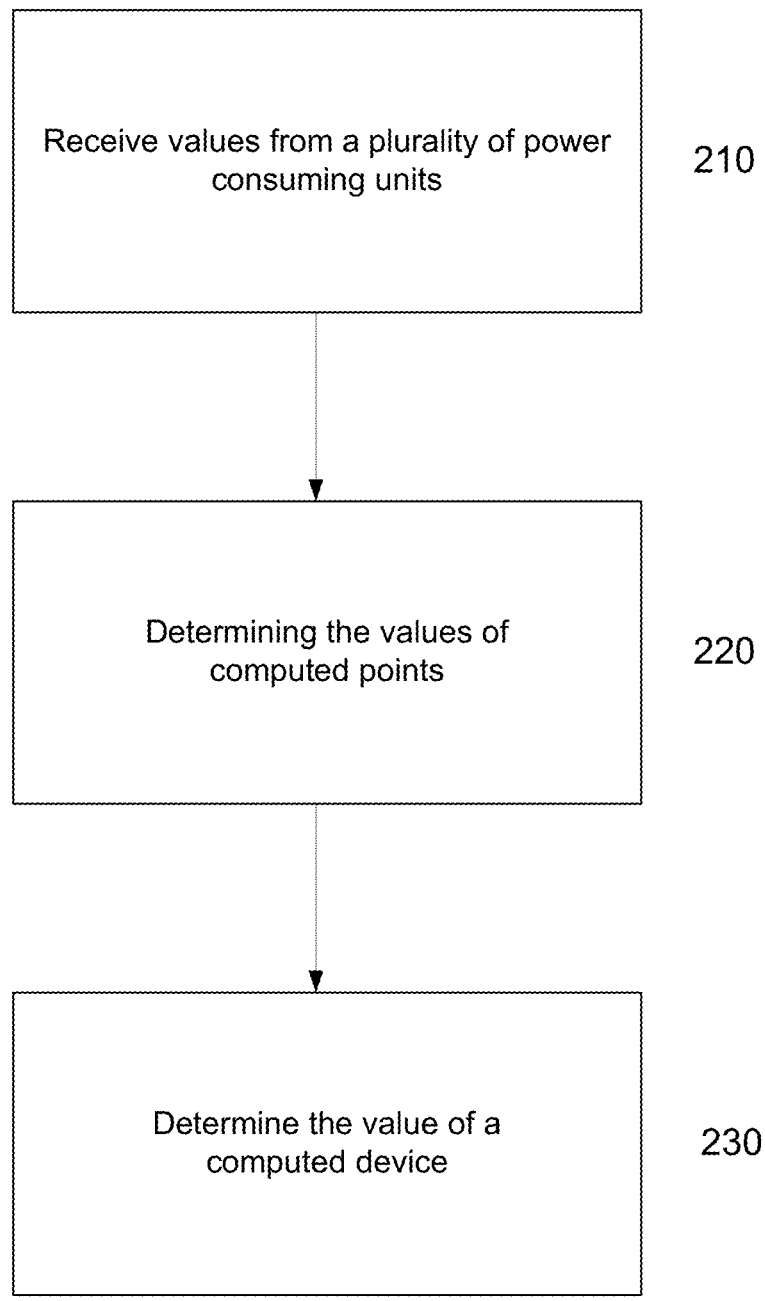
FIG. 2 is a flow chart of a method for creating and managing a computed device, according to an embodiment of the invention.

FIG. 2 shows a method 200 for creating and managing a computed device, according to an embodiment of the invention. The method 200 can be embodied as software and incorporated into the management application 125 of the server computer 120.

At operation 210, the server computer 120 receives a plurality of values from the power consuming units 110 via their associated gateways. Each value is a power consuming attribute of a power consuming device 110. Each value is attributed to a predetermined input point, or "native" point, which is configured by the management application 125. Examples of input points include bypass frequency, bypass voltage, power, temperature, humidity, load, low battery, low battery warning, battery % remaining, battery time remaining, battery voltage, communications error, power on/off, alarm, etc. The input points are user configurable, and can include any reporting value which is of interest to the user.

At operation 220, the server computer 120 determines the value of a plurality of computed points. Computed points are derived from a predetermined relationship of one or more of the input points from any power consuming device 110 coupled to the server computer 120. The predetermined relationship can be a mathematic (e.g., summation, multiply, division, ratio) and/or logical (e.g., comparisons, equality, and, or) function of one or more input points. In some embodiments, a computed point can be the summation of power consumption values of IT equipment from a particular room within a particular building. In some embodiments, a computed point can be the summation of the of the power consumption values of IT equipment from all the rooms within the particular building. In some embodiments, a computed point can be a determination that the battery power remaining in a device is above 50%. Many other types of computed points can be configured according to the needs of the user.

At operation 230, the server computer 120 determines the value of a computed device. A computed device is a virtual device, the value of which is derived from a predetermined relationship of one or more of the computed points. The predetermined relationship can be a mathematic (e.g., summation, multiply, division, ratio) and/or logical (e.g., comparisons, equality, and, or) function of one or more computed points. In some embodiments, a computed device can determine the power use effectiveness of a particular computed point or set of computed points. In some embodiments, a computed device may be the ratio of the total amount of IT power consumption to the total amount of power consumption. In some embodiments, a computed device may be power density which is determined by the power per unit area. In some embodiments, a computed device is a carbon footprint determination. Many other types of computed devices are can be configured according to the needs of the user.

The computed devices may be associated with various indicators, notifications, and/or alarms, which indicate to a user that a predetermined event has occurred, and further, a predetermined instruction may be executed as a result of the alarm. In some embodiments, when the carbon foot print of a computed device exceeds a predetermined threshold, an alarm may be activated, and one or more of the power consuming devices 110 related to the computed device may be instructed by the server computer 120 to shut down or reduce power consumption, with or without user interaction. In some embodiments, when the power use effectiveness of a computed device falls below a certain threshold, an alarm may be activated, and one or more of the power consuming devices 110 related to the computed device may be instructed by the server computer 120 to shut down or reduce power consumption, with or without user interaction. Many other types of alarms can be configured according to the needs of the user.

Figure 3:
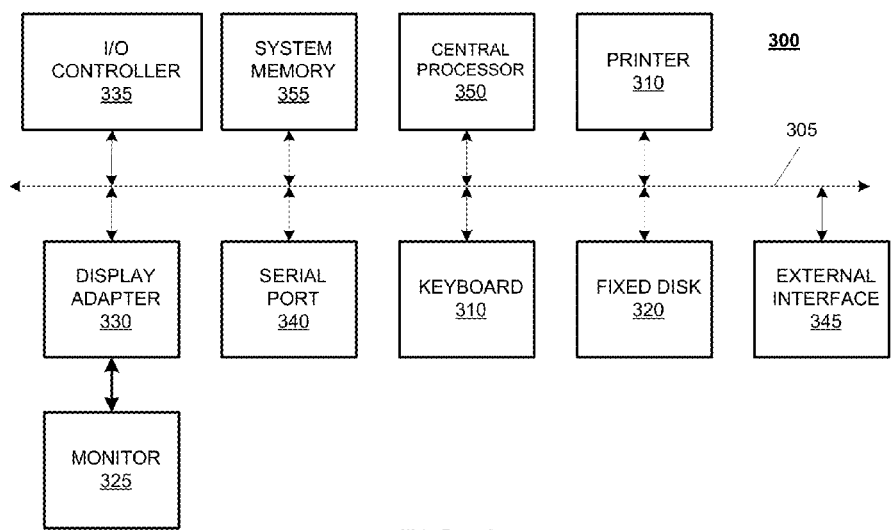
FIG. 3 is a high level block diagram of a computer apparatus, for used with the systems and method disclosed herein.

FIG. 3 is a high level block diagram of a computer apparatus 300 that may be used to implement any of the entities or components (e.g., server computer 120, etc.) described above, which may include one or more of the subsystems or components shown in FIG. 3. The subsystems shown in FIG. 3 are interconnected via a system bus 305. Additional subsystems such as a printer 310, keyboard 315, fixed disk 320, monitor 325, which is coupled to display adapter 330, and others are shown. Peripherals and input/output (I/O) devices, which couple to an I/O controller 335, can be connected to the computer apparatus 300 by any number of means known in the art, such as serial port 340. For example, the serial port 340 or external interface 345 can be used to connect the computer apparatus 300 to a wide area network such as the internet, a mouse input device, or a scanner. The interconnection via the system bus 305 allows the central processor 350 to communicate with each subsystem and to control the execution of instructions from system memory 355 or the fixed disk 320, as well as the exchange of information between subsystems. The system memory 355 and/or the fixed disk 320 may embody a computer readable medium.

Further details of embodiments of the invention can be found in the attached Appendix.

Any of the software components, user interfaces, or methods described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method for operating a computer device, the method comprising:
   at a server computer, periodically and simultaneously receiving actual measured values for a plurality of separate power consuming units, each value representing a power attribute of one of those separate power consuming units;
   at said server computer, computing a point directly in response to those actual measured values for a plurality of those separate power consuming units, the value of each computed point being based on at least one or more of the actual measured values of the separate power consuming units;
   at said server computer, determining values for a plurality of computed points, the value of each computed point being based on at least one of the actual measured values of the separate power consuming units;
   at said server computer, determining a value for a computed device, the value of the computed device determined from a relationship between a plurality of computed points in response to said actual measured values, each value for a computed device responsive to a plurality of computed points, the plurality of computed points being from a plurality of said separate power consuming units; and
   at said server computer, in response to that value for a computed device and a predetermined threshold, and responsive to one or more of said separate power consuming units concurrently, performing one or more of the following operations: setting a thermostat, turning on or off an HVAC apparatus, raising or lowering ambient light levels, to keep a power usage effectiveness measure in a predetermined range.

2. The method of claim 1, wherein
the power attribute is responsive to a power consumption of the power consuming unit.

3. The method of claim 1, wherein
the value of at least one computed point is based on a mathematical and/or logical relationship of at least some of the values of the plurality of measured values.

4. The method of claim 3, wherein
the mathematical and/or logical relationship determines a power use effectiveness ratio.

5. The method of claim 1, wherein
the relationship between the plurality of computed points is a mathematical and/or logical relationship.

6. The method of claim 5, wherein
the mathematical and/or logical relationship determines a power use effectiveness ratio.

7. The method of claim 1, wherein
an alarm is activated based on the value of the computed device.

8. A system comprising
a plurality of power consuming devices communicatively coupled to a server computer over a network, the server computer configured to perform the method of claim 1.

9. A method for operating a computer device, the method comprising:
   at a server computer, periodically and simultaneously receiving actual measured values for a plurality of separate power consuming units, each value representing a power attribute of one of those separate power consuming units;
   at said server computer, computing a point directly in response to those actual measured values for a plurality of those separate power consuming units, the value of each computed point being based on at least one or more of the actual measured values of the serparate power consuming units;
   at said server computer, determining a value for a computed device, the value of the computed device determined from a relationship between a plurality of computed points in response to said actual measured values, each value for a computed device responsive to a plurality of computed points, the plurality of computed points being from said distinct separate power consuming units;
   at said server computer, in response to that value for a computed device, generating a signal associated with that computed device, whereby said signal can be responsive to more than one of said separate power consuming units concurrently;
   from said server computer, in response to that value for a computed device and a predetermined threshold, sending a message to one or more particular said separate power consuming units, said message directing said separate power consuming units to perform one or more of the following operations: setting a thermostat, turning on or off an HVAC apparatus, raising or lowering ambient light levels, to keep a power usage effectiveness measure in a predetermined range.

10. A method as in claim 9, wherein
the power attribute is responsive to a power consumption of the power consuming unit.

11. A method as in claim 9, wherein
the value of at least one computed point is based on a mathematical and/or logical relationship of at least some of the values of the plurality of measured values.

12. A method as in claim 11, wherein
the mathematical and/or logical relationship determines a power use effectiveness ratio.

13. A method as in claim 9, wherein
the relationship between the plurality of computed points is a mathematical and/or logical relationship.

14. A method as in claim 13, wherein
the mathematical and/or logical relationship determines a power use effectiveness ratio.

15. method as in claim 9, wherein
an alarm is activated based on the value of the computed device.

* * * * *